3,285,803
COMPOSITE LAMINATES AND MOLDED ARTICLES AND METHOD OF MAKING SAME

John H. Baldwin, Watchung, Paul J. Paetzold, Somerville, and Frank Starr, New Brunswick, N.J., assignors to Johns-Manville Corporation, New York, N.Y., a corporation of New York
No Drawing. Filed Oct. 3, 1962, Ser. No. 228,031
1 Claim. (Cl. 161—205)

FIELD OF INVENTION

This invention relates to the production of articles or stock from which to make finished articles, by combining a plurality of types of resinous materials, whereby one of the resinous materials can be caused to supply qualities in which another is deficient. Specifically, this invention relates to a method of preparing laminates or molded articles comprising fibers and/or fillers and at least two different resins. It is particularly concerned with combining in the same product, silicone-containing and phenolic-containing materials either as integral sheets or as chopped sheets, and the use of such a combination in specific high temperature installations. While primarily applicable to asbestos sheet materials, it may also be useful with fibrous glass, mica or other reinforcing material.

Certain thermosetting resins of the phenol group, for example phenol formaldehyde, can be formed at moderate temperatures, and at higher temperatures rendered permanently immobile and infusible. Such resins are extensively used as molding plastics and possess desirable properties, such as insolubility, mechanical strength and rigidity. But these resins also possess certain disadvantages such as the lack of resistance to high heat, which deter their use in many applications.

On the other hand, silicone resins which are also thermosetting resins, have excellent resistance to high temperatures but have a serious disadvantage in that they are difficult to adhere to many surfaces because of the low adhesion of cured silicones. Additionally, laminates or molded articles made from asbestos and silicone resins do not have optimum strength.

Thus, it was determined that if the desirable qualities of each type of resin could be combined in a composite material, such a material would be superior for many purposes to any product which would be made from either type of resin alone. Particular uses can be made of such a composite laminate in the aircraft or space vehicle industries. In these fields constant endeavors are being made to find material which can stand up under high heat and temperature. Certain materials, including the silicones have found application, but with the lack of adhesiveness, as in the case of silicones, these uses have been limited.

But, on attempting to mold the two types of resins together to form a composite produced by combining a silicone resin with a base of an infusible phenol thermosetting resin, it was discovered that the silicone resins would not adhere to cured or infusible phenol resins by normal lamination or molding techniques. Additionally, difficulties have been encountered in molding silicone resins against phenol resins which are not cured but which are in the potentially reactive state for the reason that the temperature and time required to cause the resins to be converted to the final infusible state differ widely from the optimum conditions for molding silicone resins.

Moreover, in attempting to solve these difficulties by preparing a saturated sheet containing two or more resins from a solvent solution, one encounters the problems of solvency, compatibility, and saturant pot life.

It has now been discovered that a silicone-phenol sheet material may be produced by a method comprising interleaving sheets, or blending of chopped sheet particles, of silicone and phenolic resins, in any arrangement or proportion under certain controlled curing conditions whereby the phenolic resin is first cured and then the silicone resin is cured.

Because the method described herein provides a way of obtaining a high degree of cure and high subsequent heat resistance for the article, it has been possible to reduce or in many cases to eliminate the post-cure and the possible blistering during post-cure.

By placing at least one phenolic sheet on at least one side of the laminate, it has been possible to use desired adhesives to bond the composite of other materials.

OBJECTS

A principal object of this invention was the provision of a process for forming composite laminate or similar materials containing both silicone resins and phenolic resins.

It was another object of this invention to provide a satisfactory bonded silicone-phenolic laminate whereby the beneficial properties of both could be utilized.

A further object of this invention was to provide a method for preparing such silicone-phenolic laminates.

Another object was to provide a high-temperature-resistant, adherable silicone-phenol laminate which could be employed in high-temperature insulation and similar applications and be readily adherable to the surface to be protected.

Other objects and further scope of applicability of the present invention will become apparent from the detailed description given hereinafter.

BRIEF DESCRIPTION OF THE INVENTION

It has been discovered that the above objects may be satisfied by employing a two-step press-cure for a phenolic-silicone resin laminate wherein the press pressure, time and temperature required for the lower-curing-temperature phenolic resin are completed first and then, without releasing the pressure, the press conditions raised to that required for the silicone resin to accomplish its cure.

It is believed that as the first resin melts, it tends to intermingle in the pores of the adjacent sheet, then gels to a solid. Upon raising the press conditions, the second resin melts and gels similarly and may intermingle in the pores of the first. At this time the first receives an advanced cure as in post-curing, but is protected from air and under pressure which is believed to reduce the degradation that otherwise might be caused by the high temperature used.

A post-cure of either resin is made unnecessary by the times and temperatures used and by employing porous pads to permit escape of volatiles.

Bonding of other materials to a finished silicone laminate on one side of which is incorporated a single phenolic sheet and press curing the assembly as above.

GENERAL DESCRIPTION OF THE INVENTION

A more complete understanding of the invention may be obtained by reference to the following examples of operations within the scope of this invention. In these examples all parts and percentages are by weight unless otherwise indicated.

Example 1

Four plies of a high bulk asbestos paper saturated with about 38 to 40% of silicone resin were combined. To this was applied a single ply of phenol-formaldehyde saturated high bulk asbestos paper. The phenolic resin that had a phenol to formaldehyde ratio of about 1 to 1.5 was used in about 38–41% of the sheet. Both resin impregnated sheets were in the "B" stage. The laminate was covered first with glass cloth scrims and then asbestos paper. The press closed and the pressure raised to 1000 p.s.i. While at pressure, the temperature was raised to between 300 and 350° F., for approximately 30 minutes which cured the phenolic resin. The temperature was increased while at the same pressure to between 500–570° F. for about 2 hours. This cured the silicone resin and served as post-cure for the phenolic resin. The press was then cooled to room temperautre.

*Example II*

The laminate made in accordance with Example I was treated on the phenolic side with a modified phenolic adhesive. Strips of phenolic resin saturated asbestos paper were then adhered to the adhesive at spaced intervals along the width of the sheet. Intermittent the strips was applied an insulation selected from the group consisting of silica aerogel, pyrogenic silica, and mixtures thereof of the type described in U.S. patent application Serial No. 143,000 filed September 25, 1961 now U.S. Letters Patent No. 3,055,831. A glass scrim ply containing the modified phenolic adhesive was applied over the strips and insulation. This laminate was then mechanically fastened to the wing flap of a jet aircraft.

The laminate prepared in Example II performed well under flight conditions including being subjected to approximately 800° F. intermittently on take off. The laminate did not separate and the silicone did not blister.

The phenolic resins used within the scope of this invention are the condensation products of a phenol and an aldehyde, e.g., phenol, cresol, p-hydroxy diphenyl and other phenols with formaldehyde, furfural or other aldehydes. Any of the laminating types of phenolic resins which are capable of being cured to a thermoset stage may be used. The preparation and chemical construction of the usuable phenolic resins are discussed in "Encyclopedia of Chemical Technology" published in 1953 by the Interscience Encyclopedia, Inc., volume 10, pages 335 to 369. Suitable phenolic resins are also disclosed in numerous patents including U.S. Letters Patents Nos. 1,126,926, 2,272,155 and 2,736,718.

The silicone resins used within the scope of this invention are the condensation products or polymerization products of siloxanes having the general formula $R_xSiO_{4-x}$ wherein R may be a hydrocarbon or halogenated hydrocarbon, such as methyl or phenyl, and wherein $x$ is a number between 1 and 3. Where there is more than one hydrocarbon radical, these may be the same or different. The preparation and chemical construction of the silicone resins are discussed in "Silicones," published in 1959 by Reinhold Publishing Corp., pages 63–84 among others and in "Silicones," published in 1960 by Philosophical Library, Inc., pages 195–212. Illustrative patents include U.S. Letters Patents Nos. 2,258,-220 and 2,442,613.

In producing the composite article for the high temperature insulation using the novel phenol-silicone sheet described above, various adhesives and insulation materials may be used dependent on the actual results desired.

The silicone and phenol saturated sheets may be any asbestos or other material capable of high temperature use and particularly the high bulk asbestos papers as described in U.S. patent application Serial No. 847,085 filed October 19, 1959, now abandoned, which disclosure is incorporated herein by reference. By "high bulk" it is meant having a bulk greater than 0.30, defined as the caliper (thickness) in inches, divided by the weight in pounds per 100 sq. ft., times 100. The resins may be used in amounts from 30 to 50 percent saturation with 35 to 45 being preferred.

The curing conditions can vary between 1000 and 1300 p.s.i. and between 260–370° F. for phenolic for about 30 to 40 minutes, and between 385 to 570° F. for the silicone resin for about ½ to 2½ hours.

It is believed the above provides a complete description of the invention in such manner as to distinguish it from other inventions and from what is old, and provides a description of the best mode contemplated of carrying out the invention and thereby complies with the patent statutes.

It is to be understood that variations and modifications of the invention, as illustrated by specific examples herein, may be made without departing from the spirit of the invention. It is also to be understood that the scope of the invention is not to be interpreted as limited to the specific embodiments disclosed herein but only in accordance with the appended claim, when read in the light of the foregoing description.

What we claim is:

A phenol-silicone resin composite laminate comprising thermoset phenol formaldehyde impregnated high bulk asbestos paper integrated and laminated in intimate contact with thermoset silicone resin impregnated high bulk asbestos paper, each of said asbestos papers having a bulk greater than 0.3, wherein the resin in both papers is present in amount equal to about 35% to 45% by weight of the paper, strips of phenolic resin saturated asbestos paper adhered to the phenolic resin asbestos paper at spaced intervals, insulation contained within the spaces between said strips selected from the group consisting of silica aerogel, pyrogenic silica, and mixtures thereof, and an outer sheet material adhered to said strips and covering said insulation therebetween.

References Cited by the Examiner

UNITED STATES PATENTS

| | | |
|---|---|---|
| 2,441,422 | 5/1948 | Krieble et al. |
| 2,845,378 | 7/1958 | Dereich. |
| 2,927,910 | 3/1960 | Cooper. |

ALEXANDER WYMAN, *Primary Examiner.*

MORRIS SUSSMAN, EARL M. BERGERT,
*Examiners.*

UNITED STATES PATENT OFFICE
CERTIFICATE OF CORRECTION

Patent No. 3,285,803                 November 15, 1966

John H. Baldwin et al.

It is hereby certified that error appears in the above numbered patent requiring correction and that the said Letters Patent should read as corrected below.

Column 2, line 53, after "laminate" insert -- with an adhesive is made possible by making a silicone laminate --.

Signed and sealed this 19th day of September 1967.

(SEAL)
Attest:

ERNEST W. SWIDER                     EDWARD J. BRENNER
Attesting Officer                      Commissioner of Patents